US008702428B2

(12) United States Patent
Davey

(10) Patent No.: US 8,702,428 B2
(45) Date of Patent: Apr. 22, 2014

(54) AGE AND THE HUMAN ABILITY TO DECODE WORDS

(75) Inventor: Sonya Davey, Gaithersburg, MD (US)

(73) Assignee: Sonya Davey, Gaithersburg ( * ) Notice: Subject to any disclaimer, the term of this patent is extended or adjusted under 35 U.S.C. 154(b) by 1114 days.

(21) Appl. No.: 12/422,928

(22) Filed: Apr. 13, 2009

(65) Prior Publication Data

US 2009/0197226 A1 Aug. 6, 2009

(51) Int. Cl.
*G09B 17/00* (2006.01)
(52) U.S. Cl.
USPC ........................................................ 434/178
(58) Field of Classification Search
CPC ..... G09B 17/00; G09B 17/003; G09B 17/006
USPC ........................................................ 434/178
See application file for complete search history.

(56) References Cited

U.S. PATENT DOCUMENTS

| 6,299,452 | B1 * | 10/2001 | Wasowicz et al. | 434/178 |
|---|---|---|---|---|
| 6,676,413 | B1 * | 1/2004 | Best et al. | 434/178 |
| 7,080,983 | B2 * | 7/2006 | Barker | 434/167 |
| 7,089,983 | B2 * | 8/2006 | Li | 156/378 |
| 2004/0049391 | A1 * | 3/2004 | Polanyi et al. | 704/271 |
| 2004/0067472 | A1 * | 4/2004 | Polanyi et al. | 434/178 |
| 2006/0069562 | A1 * | 3/2006 | Adams et al. | 704/251 |
| 2008/0311547 | A1 * | 12/2008 | Samuels | 434/178 |

\* cited by examiner

*Primary Examiner* — Kesha Frisby

(57) ABSTRACT

Embodiments relate to a method, a system and a computer readable medium having instructions for determining a reading fluency starting age comprising testing a population of different ages on an alphabetical test comprising reading a sentence, ranking a reading fluency score on the alphabetical test versus ages of the population, and determining the reading fluency starting age as an age at which the reading fluency score on the alphabetical test versus ages of the population shows a maximum.

20 Claims, 3 Drawing Sheets

AGE AND THE HUMAN ABILITY TO DECODE WORDS

RELATED APPLICATION

None.

FIELD OF INVENTION

The embodiments relate to a tool for determining the human ability to decode words.

BACKGROUND

Reading is defined as the multi-dimensional cognitive process of decoding symbols for the purpose of deriving meaning. In other words, reading is the ability to decode and comprehend text. The first aspect of reading is decoding; evaluating decoding speed is an indication of reading fluency.

Decoding involves the knowledge of individual sounds or phonemes (phonemic awareness), familiarity with the letters in the language (letter knowledge), and the knowledge that each letter corresponds with a specific sound (alphabetic principle). In order to bring clarity to these three steps, let us track the reading stages with the words 'cat' and 'hat'. In the phonemic awareness stage, a child recognizes various sounds through oral and verbal interactions. The child unconsciously recognizes the hard 'c' sound before cat, and the soft 'h' sound before hat while listening and speaking. During the next stage of letter knowledge, a child learns his alphabet. In the last stage, alphabetic principle, the activities involved in the first two stages are combined. The child recognizes that the letter 'C' results in the hard 'c' sound in the word 'cat,' while the letter 'H' results in the soft 'h' sound in the word 'hat.' Decoding is the act of using the alphabetic principal to decipher words.

The above process outlines initial decoding—when a reader begins to slowly sound out words. Fluency in decoding, however, occurs when the reader has knowledge of larger units, allowing efficient reading without sounding out each letter. This knowledge allows automatically, which is decoding without conscience attention; readers are able to recognize and comprehend the text simultaneously. This degree of fluency causes the readers to lose careful attention to specific letters.

According to Jeanne Chall's research published in *Chall's Stages of Reading Development*, Scholastic Red., 2002, 1 Jul. 2008, there are five stages of reading development. The first consists of pre-reading, which is oral and verbal development in the language. The next stage is logographic reading, which is the ability to recognize signs and visual patterns in text. The next stage is early alphabetic reading, which is sound and letter correspondence. The fourth stage consists of memory for sight words and decoding by analogy. The last stage, orthographic reading, is the ability to decode whole words. This is the stage where the reader is considered fluent at decoding.

The embodiments disclosed herein build on Chall's five stages of reading development and my own prior research. In April 2007, I completed a research project entitled "Familiarity Breeds Contempt" to determine whether the familiarity of a language affects one's ability to recognize certain characters. Our method for conducting the research was through the use of two test that contained the same texts—one in English and the other in the Microsoft® font Webdings. We found that people are able to recognize an indicated symbol from an unfamiliar language more easily than an indicated letter from the English language. During the English phrase test, English was a visual distraction because fluent readers read whole words at a time, and thereby did not recognize the indicated letter as easily. In the Webdings phrase test, however, because there was no fluency in the language, the decoding process did not occur automatically and the individual symbol could be isolated.

The following were the two tests used in the prior research of April 2007:

Test One (F Test): Find the number of F's in the following statement: ALFRED FINDS THAT THE FRUIT OF HARD WORK IS ALWAYS SWEETER THAN TAKING THE CREDIT OF THE WORK OF ANOTHER.

Test Two (Symbols Test): Find the number of  in the following statement:

SUMMARY OF THE INVENTION

The embodiments relate a method of determining a reading fluency starting age including: testing a population of different ages on an alphabetical test comprising reading a sentence, ranking a reading fluency score on the alphabetical test versus ages of the population, and determining the reading fluency starting age as an age at which the reading fluency score on the alphabetical test versus ages of the population shows a maximum.

Preferably, at least a portion of the method is carried out on a system comprising a storage medium configured to store alphabetical test data; and a processor configured to retrieve the alphabetical test data and determine the reading fluency starting age by ranking the reading fluency score versus ages of the population of individuals of different ages contributing the alphabetical test data.

Preferably, the reading fluency score comprises a percentage of individuals of a given age that earned a predetermined score.

Preferably, the reading fluency starting age comprises a peak in plot of age versus percentage of individuals of a given age that earned a predetermined score.

Another embodiment relates to a system comprising: a storage medium configured to store alphabetical test data; and a processor configured to retrieve the alphabetical test data and determine a reading fluency starting age by ranking a reading fluency score versus ages of a population of individuals of different ages contributing the alphabetical test data.

Another embodiment relates to a tangible computer readable medium comprising computer executable instructions for determining a reading fluency starting age comprising testing a population of different ages on an alphabetical test comprising reading a sentence, ranking a reading fluency score on the alphabetical test versus ages of the population, and determining the reading fluency starting age as an age at which the reading fluency score on the alphabetical test versus ages of the population shows a maximum. Preferably, at least a portion of the executable instructions are carried out on a system comprising a storage medium configured to store alphabetical test data; and a processor configured to retrieve the alphabetical test data and determine the reading fluency starting age by ranking the reading fluency score versus ages of the population of individuals of different ages contributing the alphabetical test data.

Another embodiment relates to a computer usable medium including a program for determining a reading fluency starting age comprising computer program code for testing a population of different ages on an alphabetical test comprising reading a sentence; computer program code for ranking a reading fluency score on the alphabetical test versus ages of the population; and computer program code for determining the reading fluency starting age as an age at which the reading fluency score on the alphabetical test versus ages of the population shows a maximum. Preferably, at least a portion of the computer program code is executed on a system comprising a storage medium configured to store alphabetical test data; and a processor configured to retrieve the alphabetical test data and determine the reading fluency starting age by ranking the reading fluency score versus ages of the population of individuals of different ages contributing the alphabetical test data.

Another embodiment relates to a computer program product, comprising a computer usable medium having a computer readable program code embodied therein, said computer readable program code adapted to be executed to implement a method for determining a reading fluency starting age, said method comprising: testing a population of different ages on an alphabetical test comprising reading a sentence; ranking a reading fluency score on the alphabetical test versus ages of the population; and determining the reading fluency starting age as an age at which the reading fluency score on the alphabetical test versus ages of the population shows a maximum. Preferably, at least a portion of the computer readable program code is executed on a system comprising a storage medium configured to store alphabetical test data; and a processor configured to retrieve the alphabetical test data and determine the reading fluency starting age by ranking the reading fluency score versus ages of the population of individuals of different ages contributing the alphabetical test data.

Yet another embodiment relates to a computer implemented method for determining a reading fluency starting age, comprising storing the alphabetical test data on a first computing device; retrieving the alphabetical test data on a second computing device; and determining the reading fluency starting age by ranking the reading fluency score versus ages of the population of individuals of different ages contributing the alphabetical test data on the second computing device. Preferably, at least a portion of the method is carried out on a system comprising a storage medium configured to store alphabetical test data; and a processor configured to retrieve the alphabetical test data and determine the reading fluency starting age by ranking the reading fluency score versus ages of the population of individuals of different ages contributing the alphabetical test data.

Yet another embodiment relates to a computer implemented system comprising a component executing on a computer that tests a population of different ages on an alphabetical test comprising reading a sentence; a component executing on a computer that ranks a reading fluency score on the alphabetical test versus ages of the population, and a component executing on a computer that determines the reading fluency starting age as an age at which the reading fluency score on the alphabetical test versus ages of the population shows a maximum.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
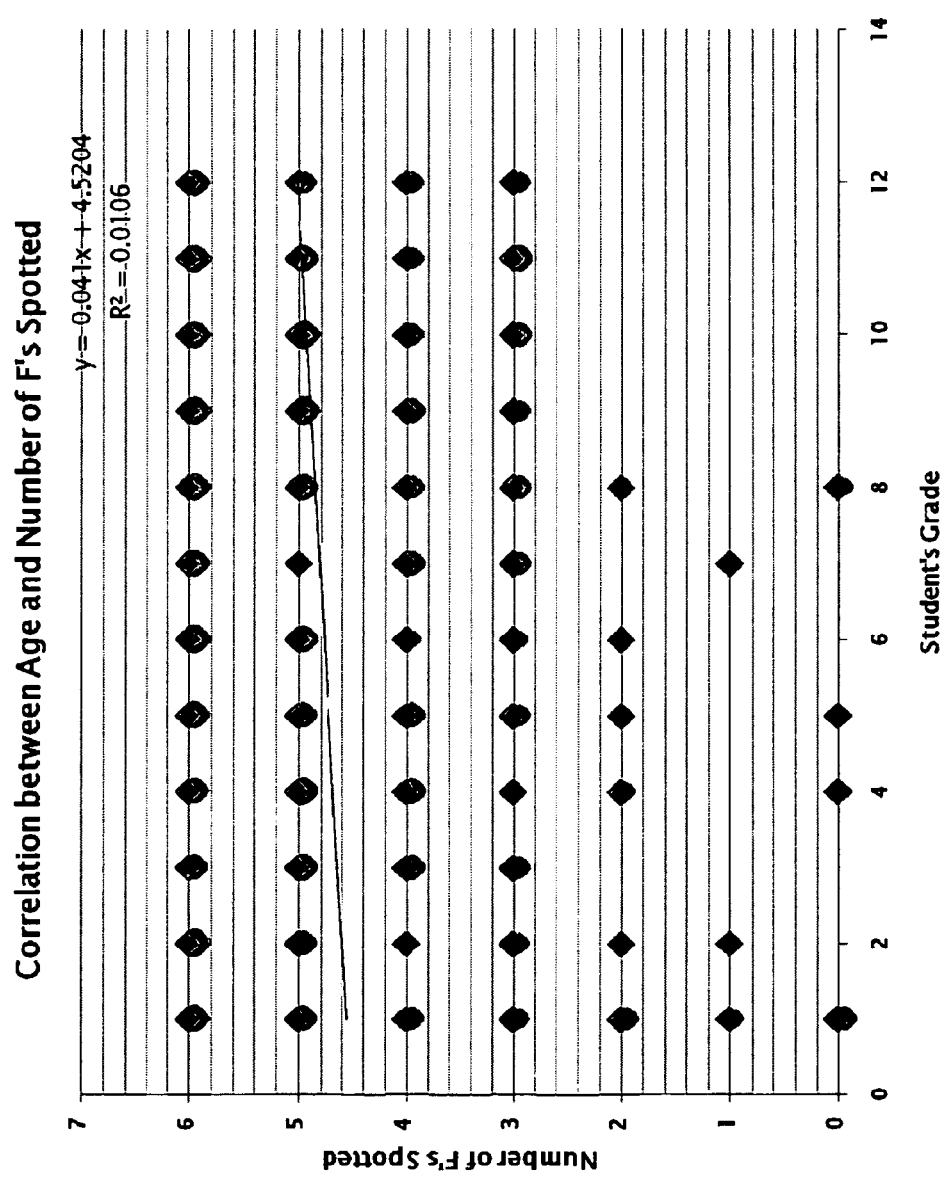
FIG. 1 shows a correlation between age and number of F's spotted in the F Test.

The embodiments disclosed herein are directed to use automatically and lack of attention to specific letters as the basis for evaluating reading fluency at different age groups. Ability to decode words has been evaluated by the number of F's seen. The embodiments disclosed herein unexpectedly show a correlation between the age of a reader and the number of F's spotted (his/her ability to decode words). The correlation provides that there is a certain age, termed herein as the "reading fluency starting age," when readers begin to develop greatest fluency at decoding word. Furthermore, it was unexpectedly found that readers noticed fewer F's, indicating higher reading fluency, for readers who developed a greater reading fluency than that of the readers at the reading fluency starting age.

To begin with, my hypothesis was a null hypothesis that (a) there is no correlation between the performance of the F Test (ability to recognize letters) and the age of the student, and (b) there is no correlation between the performance of the Symbols Test and age.

The research was conducted on students between the age of five and seventeen, who went to the English Medium Schools in India. The students were tested in August 2008.

Each student was tested individually. The method of testing was the F Test and the Symbols Test (depicted in background). In Test One (F Test) students were given fifteen seconds to find the number of occurrences of the letter "F" in the following statement: ALFRED FINDS THAT THE FRUIT OF HARD WORK IS ALWAYS SWEETER THAN TAKING THE CREDIT OF THE WORK OF ANOTHER.

In Test Two (Symbols Test) students were also given fifteen second to find the number of occurrences of the symbol  in the following statement:  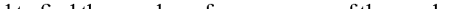 

Due to the manner of the research, the materials were limited to the two tests described above, subjects to be tested, and a stopwatch. However, because human subjects were being tested considerations that had to be accounted for were lack of cooperation, testing environment, prior experience in such tests, and education background. To account for these possible disparities, the sample size was very large—472 students in all.

The variables in the research were quite simple. The independent variable being the age of the student and the dependent variable being the student's score on each test. Note: the scores for each test are independent of each other. For example, if a student recognizes four F's, then the student will receive a score of 4 out of the 6 total F's present on Test one. If that student recognizes all of the symbols, then the student will receive a score of 6 out of 6 on Test Two. The person taking both tests remains constant, therefore intellect and other abilities are constant. The control group for the research is the data for the Symbols Test. The Symbols Test served as the control because all students have the same prior knowledge in reading the symbols (none of the students have fluency in this "language"), regardless of the age of the student.

A Spearman Rank Test was selected for this data because the independent variable was a measurement (age) and the dependent variable was count data (the number of letters of symbols spotted).

Data Collection and Statistical Analysis:

The age of each student tested was correlated with his/her score on the F Test as shown Table 1.

Figure 2:
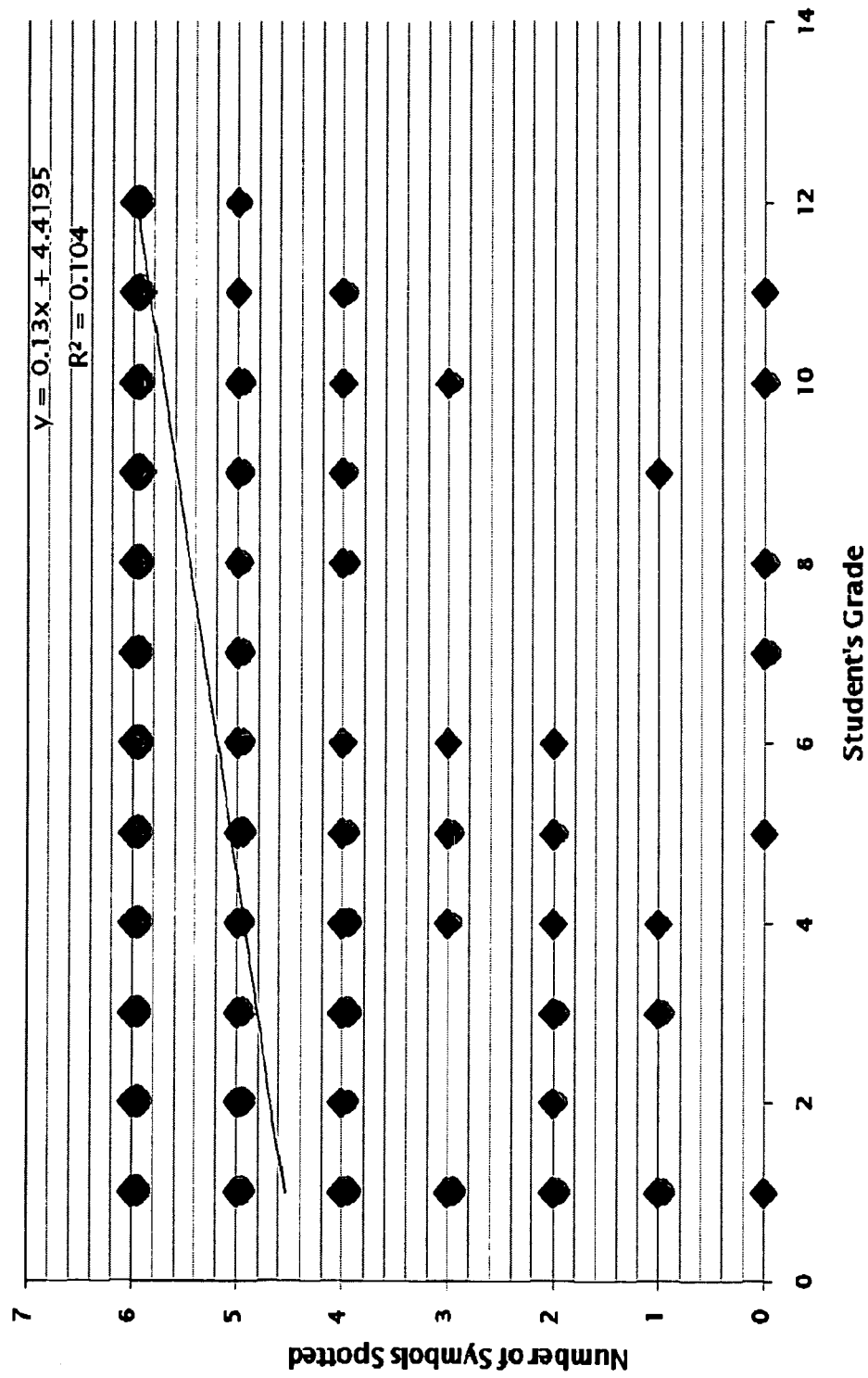
FIG. 2 shows a correlation between age and number of symbols spotted in the Symbols Test.

FIG. 1 shows that the data of the F Test are significant, as the p-value for the F Test data is less than 0.0001 or 0.01%. FIG. 2 shows that the data of the Symbols Test are significant, as the p-value for the Symbols Test data is less than 0.0001 or 0.01%.

The sample size was 472 students, with at least 24 students in each age group. Both correlations were significant, as the p-values were less than 0.0001. Therefore, the null hypothesis can be rejected: there is a correlation between the performance of the F Test (ability to recognize letters) and the age of the participant, and there is also a correlation between the performance of the Symbols Test (ability to recognize symbols) and the age of the participant.

FIG. 1 and FIG. 2 show that the line of best fit for the correlation graph of the Symbols Test has a rate of change that is 9.5 times greater than that of the F Test (determined by the slopes of both lines.) This demonstrates that the Symbols Test, which is the control test, has a far greater correlation between age and score, than the experimental F Test.

To understand the far lower rate of change for the graph of the F Test, the data was further analyzed and the percentage of student in each age group that earned a 6/6 on the F and Symbols Tests were plotted.

Tables 3 and 4 display the percentage of students from each age group who earned a 6 out of 6 in the F Test and Symbols Test, respectively.

TABLE 1

The Effect Age Has on the Number of F's Spotted by Students

| Grade | Age | The Number of Students That Spotted . . . | | | | | | | Total Students In Age Group |
|---|---|---|---|---|---|---|---|---|---|
| | | Zero F's | One F's | Two F's | Three F's | Four F's | Five F's | Six F's | |
| 1 | Five-Six | 6 | 2 | 5 | 3 | 5 | 8 | 13 | 42 |
| 2 | Six-Seven | 0 | 1 | 1 | 3 | 1 | 7 | 23 | 36 |
| 3 | Seven-Eight | 0 | 0 | 0 | 4 | 9 | 13 | 9 | 35 |
| 4 | Eight-Nine | 1 | 0 | 2 | 1 | 10 | 4 | 19 | 37 |
| 5 | Nine-Ten | 1 | 0 | 2 | 4 | 8 | 8 | 13 | 36 |
| 6 | Ten-Eleven | 0 | 0 | 0 | 2 | 2 | 12 | 27 | 43 |
| 7 | Eleven-Twelve | 0 | 1 | 0 | 5 | 7 | 1 | 14 | 28 |
| 8 | Twelve-Thirteen | 2 | 0 | 1 | 6 | 5 | 13 | 16 | 43 |
| 9 | Thirteen-Fourteen | 0 | 0 | 0 | 4 | 8 | 23 | 20 | 55 |
| 10 | Fourteen-Fifteen | 0 | 0 | 0 | 8 | 4 | 21 | 15 | 48 |
| 11 | Fifteen-Sixteen | 0 | 0 | 0 | 14 | 5 | 13 | 17 | 49 |
| 12 | Sixteen-Seventeen | 0 | 0 | 0 | 4 | 4 | 5 | 11 | 24 |

The age of each student tested was correlated with his/her score on the Symbols Test as shown Table 2.

TABLE 2

The Effect Age Has on the Number of ☒'s Spotted by Students

| Grade | Age | The Number of Students That Spotted . . . | | | | | | | Total Students In Age Group |
|---|---|---|---|---|---|---|---|---|---|
| | | Zero ☒'s | One ☒'s | Two ☒'s | Three ☒'s | Four ☒'s | Five ☒'s | Six ☒'s | |
| 1 | Five-Six | 1 | 4 | 4 | 7 | 7 | 7 | 12 | 42 |
| 2 | Six-Seven | 0 | 0 | 2 | 0 | 3 | 10 | 21 | 36 |
| 3 | Seven-Eight | 1 | 3 | 3 | 0 | 8 | 7 | 13 | 35 |
| 4 | Eight-Nine | 0 | 1 | 1 | 2 | 7 | 6 | 20 | 37 |
| 5 | Nine-Ten | 1 | 0 | 2 | 3 | 3 | 8 | 19 | 35 |
| 6 | Ten-Eleven | 0 | 0 | 1 | 1 | 1 | 5 | 32 | 43 |
| 7 | Eleven-Twelve | 3 | 0 | 0 | 0 | 0 | 5 | 20 | 28 |
| 8 | Twelve-Thirteen | 0 | 0 | 0 | 0 | 3 | 3 | 35 | 43 |
| 9 | Thirteen-Fourteen | 0 | 1 | 0 | 0 | 2 | 4 | 48 | 55 |
| 10 | Fourteen-Fifteen | 2 | 0 | 0 | 2 | 1 | 5 | 38 | 48 |
| 11 | Fifteen-Sixteen | 1 | 0 | 0 | 0 | 2 | 1 | 45 | 49 |
| 12 | Sixteen-Seventeen | 0 | 0 | 0 | 0 | 0 | 2 | 22 | 24 |

TABLE 3

The Effect Age Has on the Number of F's Spotted by Students

| Age | The Percentage of Students That Spotted... | | | | | | | Total Students in Age Group |
|---|---|---|---|---|---|---|---|---|
| | Zero F's | One F's | Two F's | Three F's | Four F's | Five F's | Six F's | |
| Five-Six | 14.30% | 4.76% | 11.90% | 7.14% | 11.90% | 19% | 30.90% | 42 |
| Six-Seven | 0% | 2.77% | 2.77% | 8.33% | 2.77% | 19.40% | 25% | 36 |
| Seven-Eight | 0% | 0% | 0% | 11.40% | 25.70% | 37.10% | 25.70% | 35 |
| Eight-Nine | 3% | 0% | 5.41% | 2.70% | 27% | 10.80% | 51.40% | 37 |
| Nine-Ten | 2.77% | 0% | 5.55% | 11.10% | 22.20% | 22.20% | 36.10% | 36 |
| Ten-Eleven | 0% | 0% | 0% | 4.65% | 4.65% | 27.90% | 62.80% | 43 |
| Eleven-Twelve | 0% | 3.57% | 0% | 17.90% | 25% | 3.57% | 50% | 28 |
| Twelve-Thirteen | 4.66% | 0% | 2.32% | 14% | 11.60% | 30.20% | 37.20% | 43 |
| Thirteen-Fourteen | 0% | 0% | 0% | 7.27% | 14.50% | 41.80% | 36.40% | 55 |
| Fourteen-Fifteen | 0% | 0% | 0% | 16.70% | 8.33% | 43.80% | 31.30% | 48 |
| Fifteen-Sixteen | 0% | 0% | 0% | 28.60% | 10.20% | 26.50% | 34.70% | 49 |
| Sixteen-seventeen | 0% | 0% | 0% | 16.70% | 16.70% | 20.80% | 45.80% | 24 |

TABLE 4

The Effect Age Has on the Number of ✦'s Spotted by Students

| Age | The Percentage of Students That Spotted... | | | | | | | Total Students in Age Group |
|---|---|---|---|---|---|---|---|---|
| | Zero ✦'s | One ✦'s | Two ✦'s | Three ✦'s | Four ✦'s | Five ✦'s | Six ✦'s | |
| Five-Six | 2.40% | 9.50% | 9.50% | 16.70% | 16.70% | 16.70% | 28.60% | 42 |
| Six-Seven | 0% | 0% | 5.55% | 0% | 8.33% | 27.80% | 58.33% | 36 |
| Seven-Eight | 2.90% | 8.60% | 8.60% | 0% | 22.90% | 20% | 37.14% | 35 |
| Eight-Nine | 0% | 2.70% | 2.70% | 5.40% | 18.90% | 16.20% | 54.10% | 37 |
| Nine-Ten | 2.90% | 0% | 5.70% | 8.57% | 8.57% | 22.80% | 54.20% | 35 |
| Ten-Eleven | 0% | 0% | 2.30% | 2.30% | 2.32% | 11.60% | 74.40% | 43 |
| Eleven-Twelve | 10.70% | 0% | 0% | 0% | 0% | 17.90% | 71.40% | 28 |
| Twelve-Thirteen | 0% | 0% | 0% | 0% | 7% | 7% | 81.40% | 43 |
| Thirteen-Fourteen | 0% | 1.80% | 0% | 0% | 3.63% | 7.27% | 87.30% | 55 |
| Fourteen-Fifteen | 4.17% | 0% | 0% | 4.17% | 2.10% | 10.40% | 79.20% | 48 |
| Fifteen-Sixteen | 2.10% | 0% | 0% | 0% | 4.10% | 2% | 91.80% | 49 |
| Sixteen-Seventeen | 0% | 0% | 0% | 0% | 0% | 8.33% | 91.70% | 24 |

Figure 3:
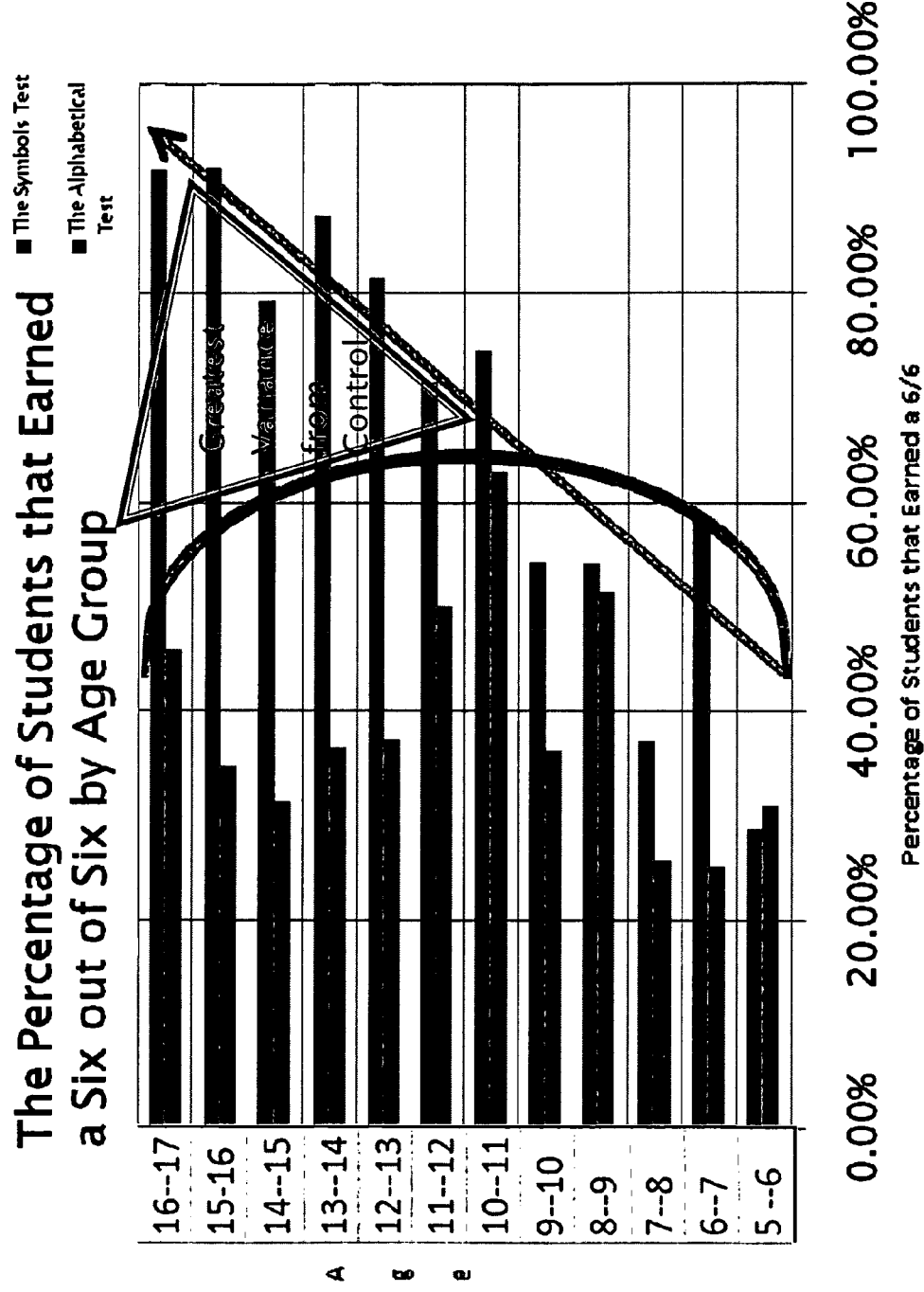
FIG. 3 shows the percentage of students that earned a six out of six by age group in the F and Symbols Tests.

This percentage of students who successfully completed the F Test and Symbols Test (i.e., earned the score of a six) was plotted versus the age group as shown in FIG. 3.

By comparing the percentage of students who earned a 6/6 by age group on both tests, a trend can easily be understood. On the control test (the Symbols Test) as students' age increases, the percentage of students earning 6 out of 6 increased. There is a direct correlation. This direct correlation is for obvious reasons—as the student becomes older, he/she has better testing ability, and is able take the test more efficiently. However, the experimental test (the F Test) depicts a variation from the control. A parabolic trend exists, with the highest percent of students earning a six out of six between age 10 and 11. Between age ten and eleven, 62.80% of the students receive a score of six out of six. After this age, there is a steady drop in the percentage of students who earned a 6/6.

The data clearly displays that after age ten to eleven there is the greatest variance from the control test. The F Test and the Symbols Test can be used as a model to find the age at which fluency in a language begins to develop. Therefore, the data supports that English medium students in India begin to develop greatest fluency at decoding words between ages 12 and 13. This model can be used on various different populations to determine the age when reading fluency develops with that particular population. Further research can be conducted through this model on students in the United States and other countries. Through this research variations in reading fluency ages may help lead to conclusions about the education of English in various countries.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The foregoing detailed description has set forth various embodiments of the devices and/or processes via the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of tangible medium used to actually carry out the distribution. Examples of a tangible mediums include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a wired communications link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to optical coupling to permit transmission of optical light, for example via an optical pipe or fiber, physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising testing a population of different ages on an alphabetical test comprising reading a sentence, wherein data for said alphabetical test is stored on a storage medium, retrieving said data for said alphabetical test by a processor and determining a reading fluency starting age, wherein said determining the reading fluency starting age is performed by ranking a reading fluency score on the alphabetical test versus ages of the population, and determining an age at which the reading fluency score on the alphabetical test versus ages of the population shows a maximum.

2. The method of claim 1, wherein the reading fluency starting age is determined by ranking the reading fluency score versus ages of the population of individuals of different ages contributing the alphabetical test data.

3. The method of claim 2, wherein the reading fluency score comprises a percentage of individuals of a given age that earned a predetermined score.

4. The method of claim 1, wherein the reading fluency starting age comprises a peak in plot of age versus percentage of individuals of a given age that earned a predetermined score.

5. A computer implemented system comprising:
a storage medium configured to store alphabetical test data; and a processor configured to retrieve the alphabetical test data and determine a reading fluency starting age by ranking a reading fluency score versus ages of a population of individuals of different ages contributing the alphabetical test data.

6. The system of claim 5, wherein the reading fluency score comprises a percentage of individuals of a given age that earned a predetermined score.

7. The system of claim 6, wherein the reading fluency starting age comprises a peak in plot of age versus percentage of individuals of a given age that earned a predetermined score.

8. A tangible non-transitory computer readable medium comprising computer executable instructions executable by one or more processors for: determining a reading fluency starting age comprising testing a population of different ages on an alphabetical test comprising reading a sentence, ranking a reading fluency score on the alphabetical test versus ages of the population, and determining the reading fluency starting age as an age at which the reading fluency score on the alphabetical test versus ages of the population shows a maximum.

9. The tangible non-transitory computer readable medium of claim 8, wherein at least a portion of the executable instructions are carried out on a system comprising: a storage medium configured to store alphabetical test data; and
a processor configured to retrieve the alphabetical test data and determine the reading fluency starting age by ranking the reading fluency score versus ages of the population of individuals of different ages contributing the alphabetical test data.

10. The tangible non-transitory computer readable medium of claim 9, wherein the reading fluency score comprises a percentage of individuals of a given age that earned a predetermined score.

11. The tangible non-transitory computer readable medium of claim 8, wherein the reading fluency starting age comprises a peak in plot of age versus percentage of individuals of a given age that earned a predetermined score.

12. A tangible non-transitory computer usable medium including a program comprising one or more instructions executable by one or more processors for determining a reading fluency starting age comprising: computer program code for testing a population of different ages on an alphabetical test comprising reading a sentence; computer program code for ranking a reading fluency score on the alphabetical test versus ages of the population; and computer program code for determining the reading fluency starting age as an age at which the reading fluency score on the alphabetical test versus ages of the population shows a maximum.

13. The tangible non-transitory computer usable medium of claim 12, wherein at least a portion of the computer program code is executed on a system comprising:
a storage medium configured to store alphabetical test data; and a processor configured to retrieve the alphabetical test data and determine the reading fluency starting age by ranking the reading fluency score versus ages of the population of individuals of different ages contributing the alphabetical test data.

14. The tangible non-transitory computer usable medium of claim 13, wherein the reading fluency score comprises a percentage of individuals of a given age that earned a predetermined score.

15. The tangible non-transitory computer usable medium of claim 12, wherein the reading fluency starting age comprises a peak in plot of age versus percentage of individuals of a given age that earned a predetermined score.

16. A computer readable medium comprising one or more instructions that, when executed by one or more processors, cause the one or more processors to determine a reading fluency starting age by: testing a population of different ages on an alphabetical test comprising reading a sentence; ranking a reading fluency score on the alphabetical test versus ages of the population; and determining the reading fluency starting age as an age at which the reading fluency score on the alphabetical test versus ages of the population shows a maximum.

17. The tangible non-transitory computer-readable medium of claim 16, wherein at least a portion of the computer readable program code is executed on a system comprising: a storage medium configured to store alphabetical test data; and a processor configured to retrieve the alphabetical test data and determine the reading fluency starting age by ranking the reading fluency score versus ages of the population of individuals of different ages contributing the alphabetical test data.

18. The tangible non-transitory computer readable medium of claim 17, wherein the reading fluency score comprises a percentage of individuals of a given age that earned a predetermined score.

19. The tangible non-transitory computer readable medium of claim 16, wherein the reading fluency starting age comprises a peak in plot of age versus percentage of individuals of a given age that earned a predetermined score.

20. The tangible non-transitory computer readable medium of claim 16 comprising the one or more instructions that, when executed by the one or more processors, cause the one or more processors to:
receive a plurality of reading fluency scores, the plurality of reading fluency scores corresponding to at least twelve individuals, wherein each of the twelve individuals has a different age than all other of the twelve individuals, and wherein each of the plurality of reading fluency scores is a F Test score or a Symbols Test score;
rank the plurality of reading fluency scores; and
determine a reading fluency starting age based an age of an individual corresponding to a maximum reading fluency score among the plurality of reading fluency scores, wherein the reading fluency score comprises a percentage of individuals of a given age that earned a predetermined score.

* * * * *